Aug. 23, 1966   F. M. PICKER   3,267,897
HYDROFOIL CRAFT
Filed Nov. 16, 1964   11 Sheets-Sheet 1
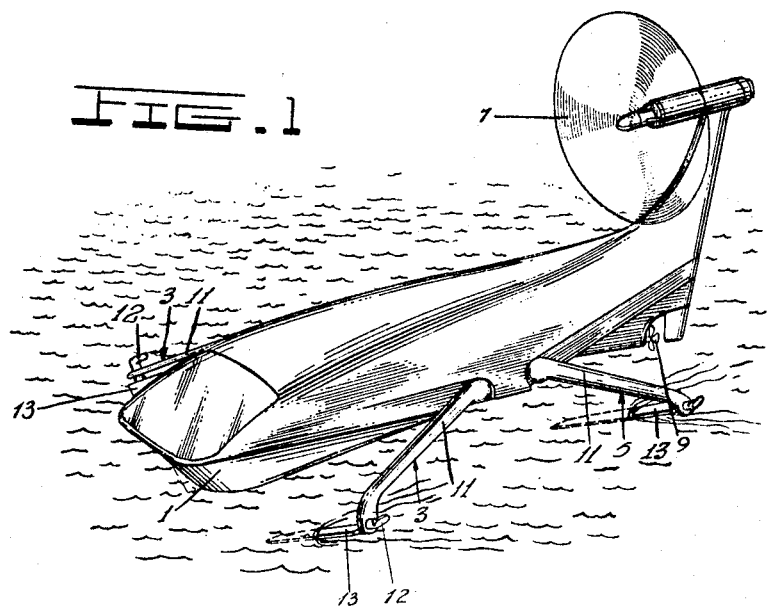
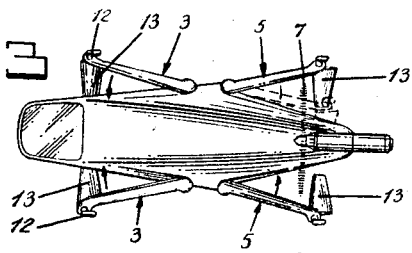
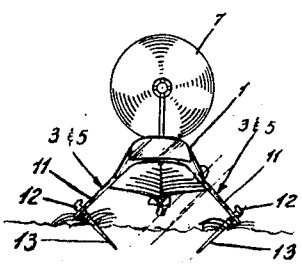
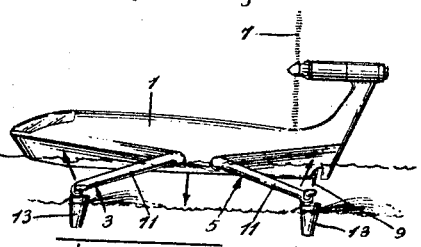

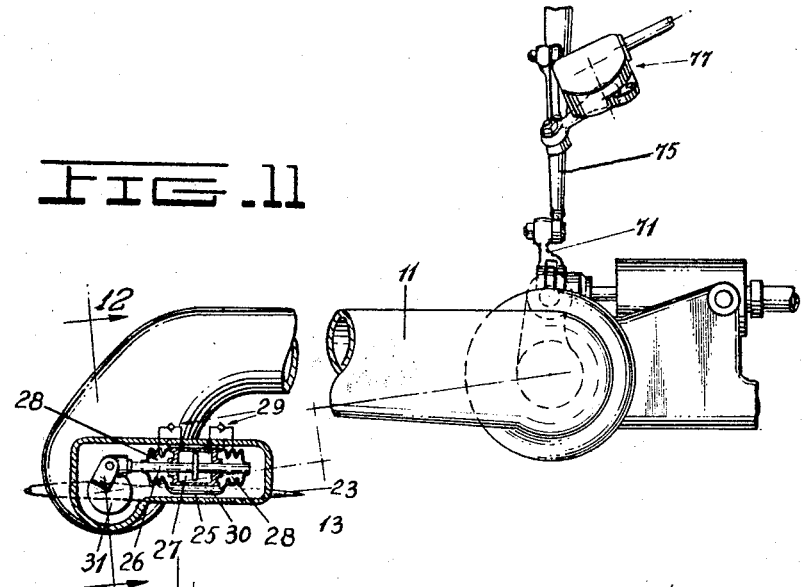
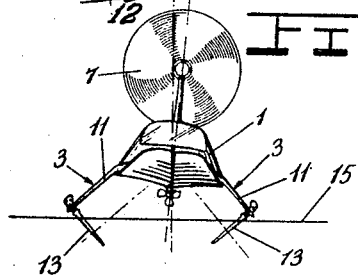
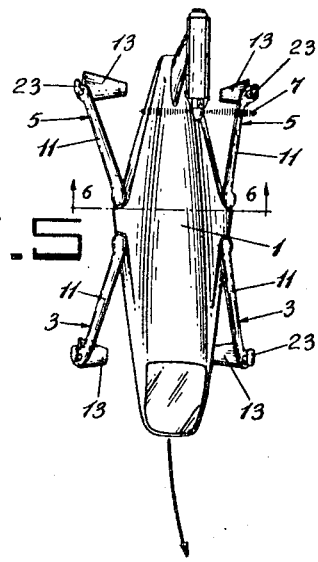
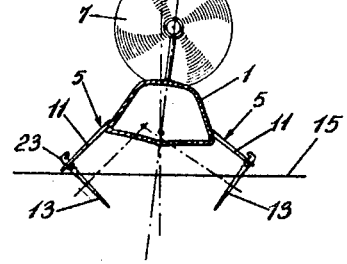

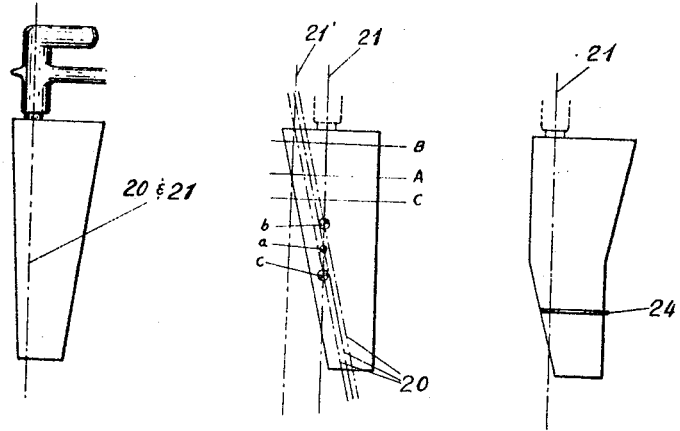
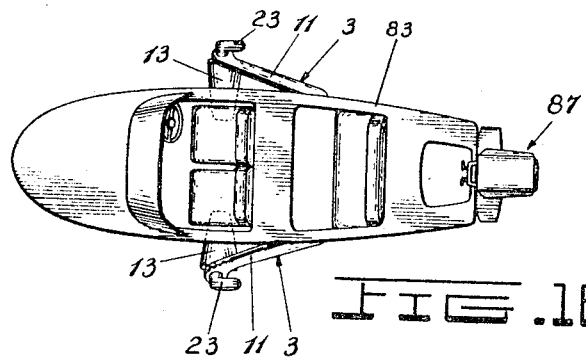
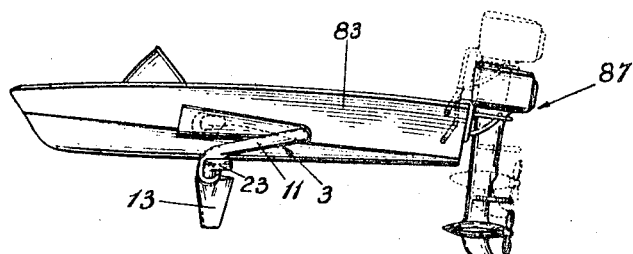

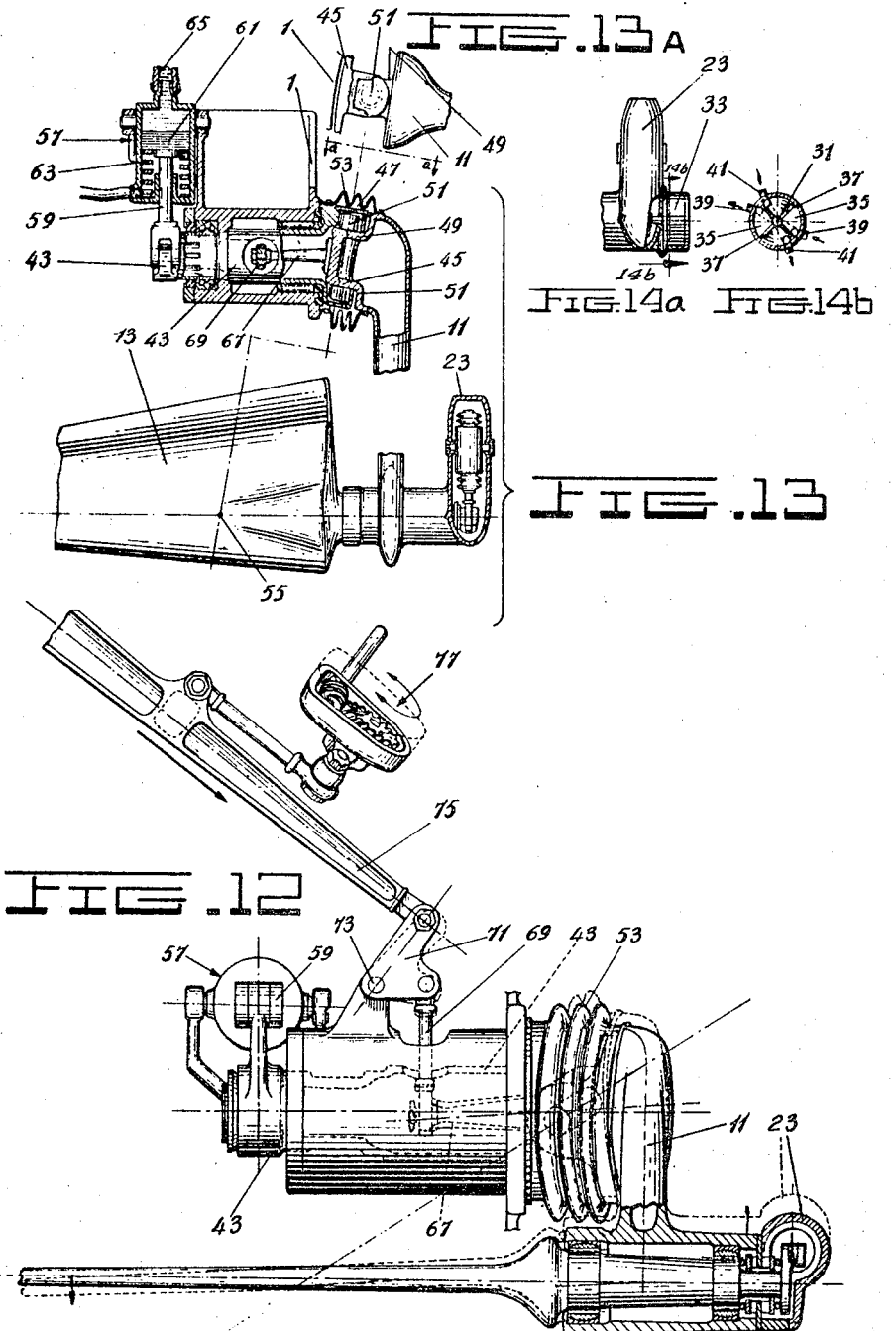

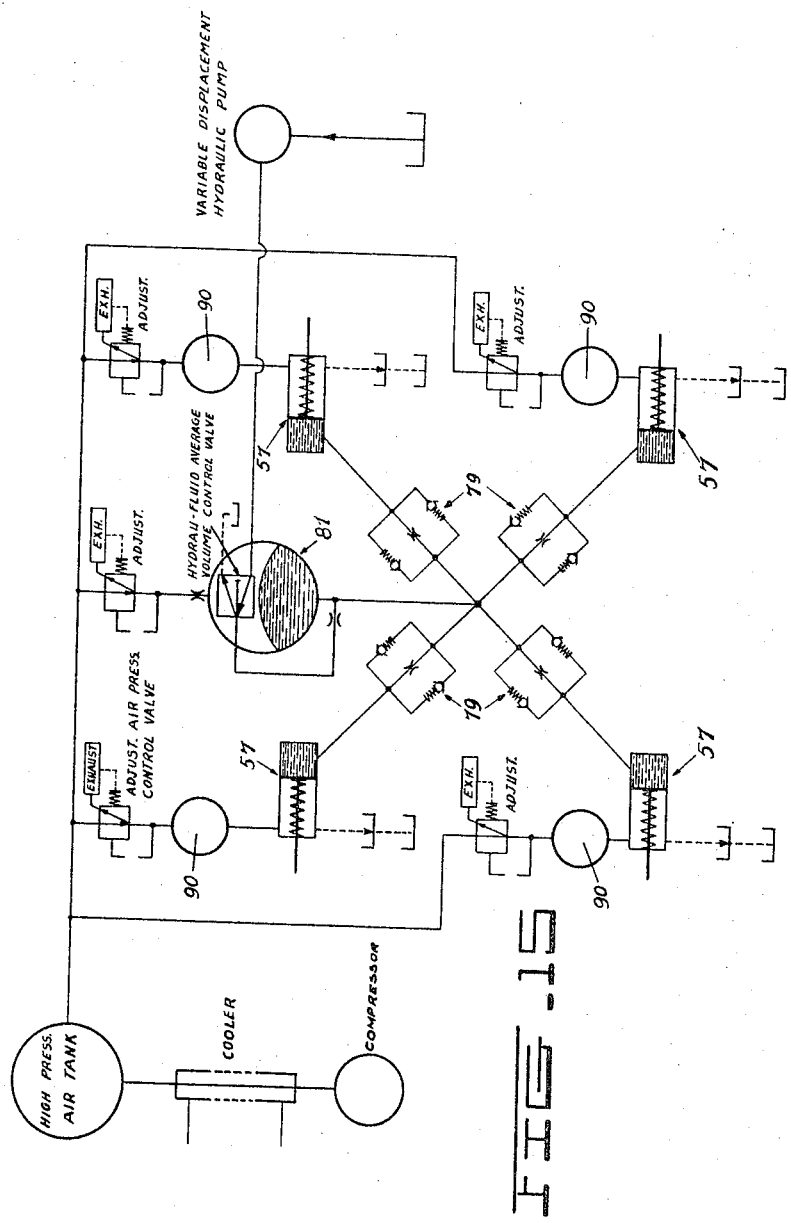

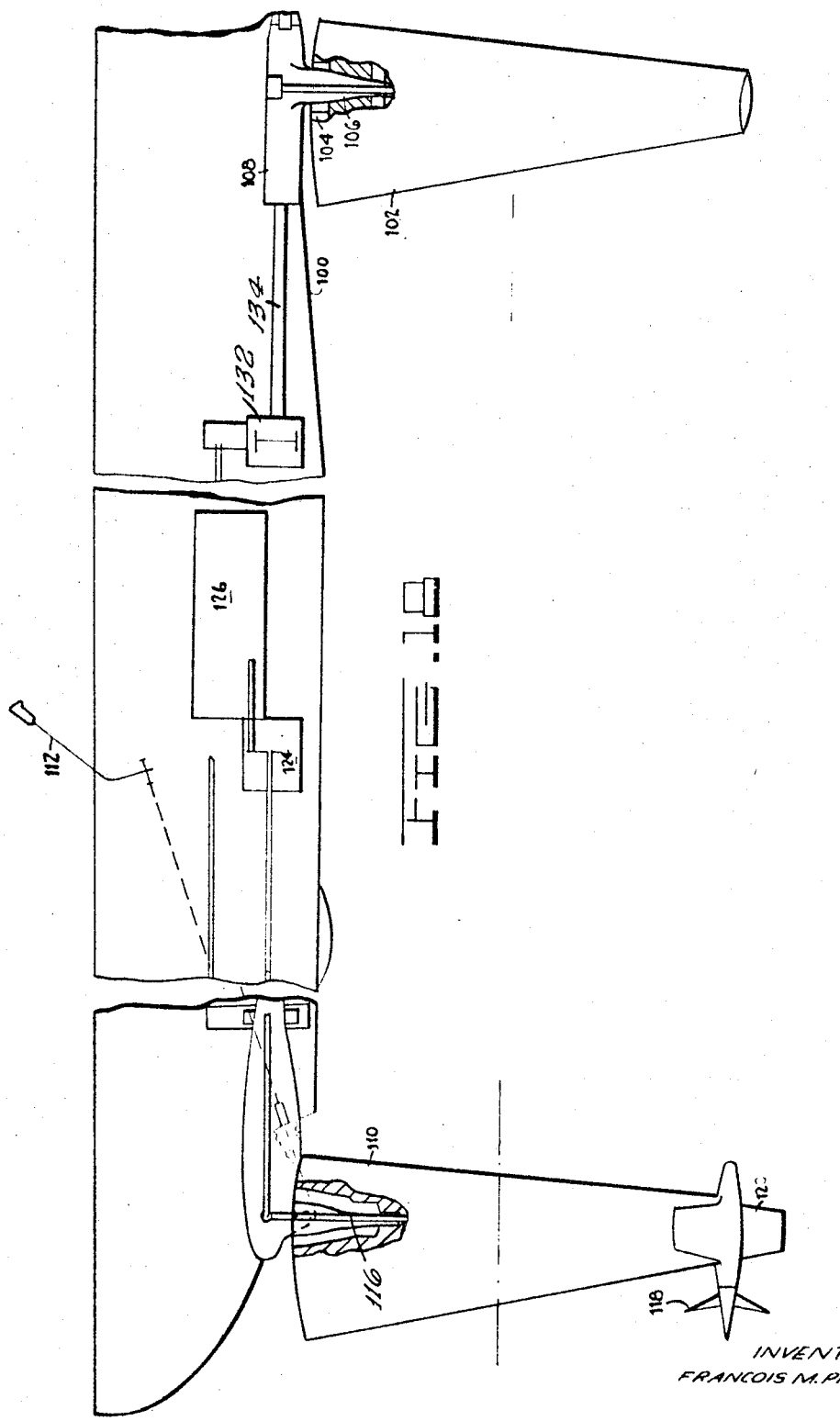

Aug. 23, 1966   F. M. PICKER   3,267,897
HYDROFOIL CRAFT
Filed Nov. 16, 1964   11 Sheets-Sheet 8
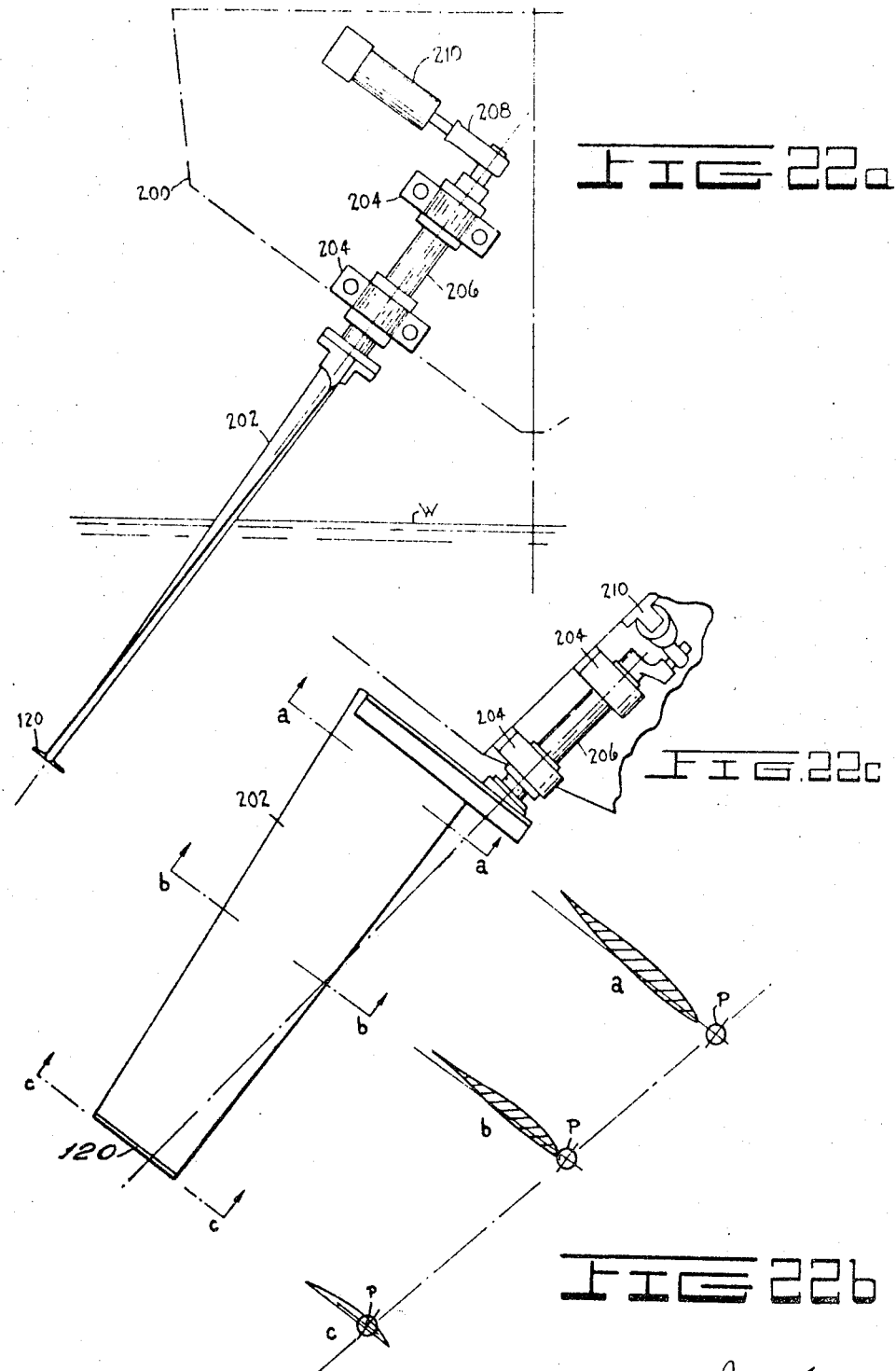

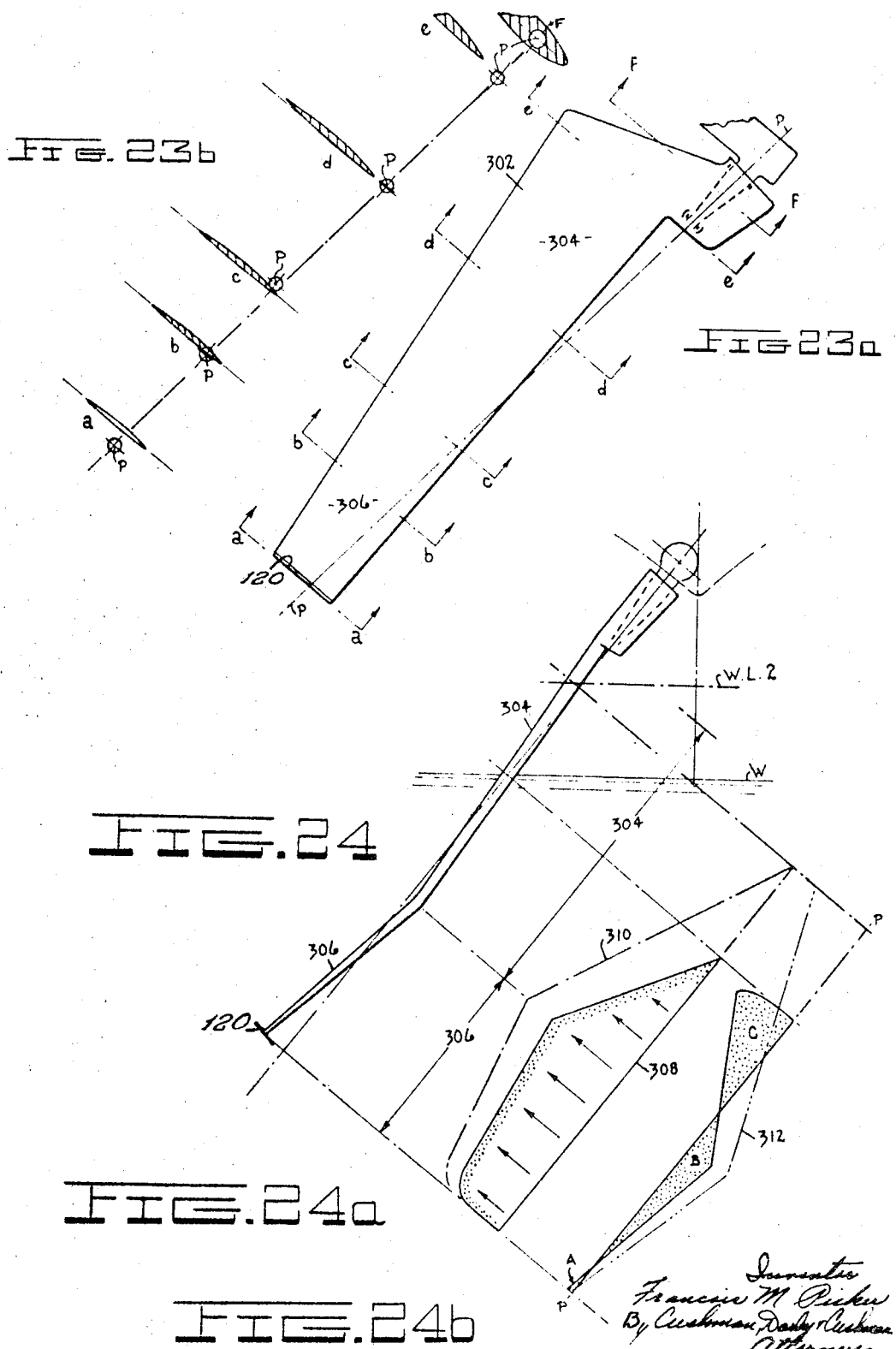

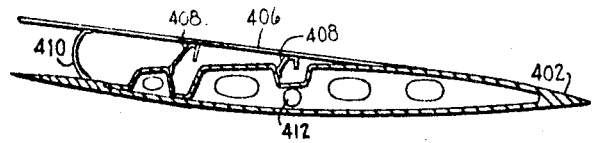
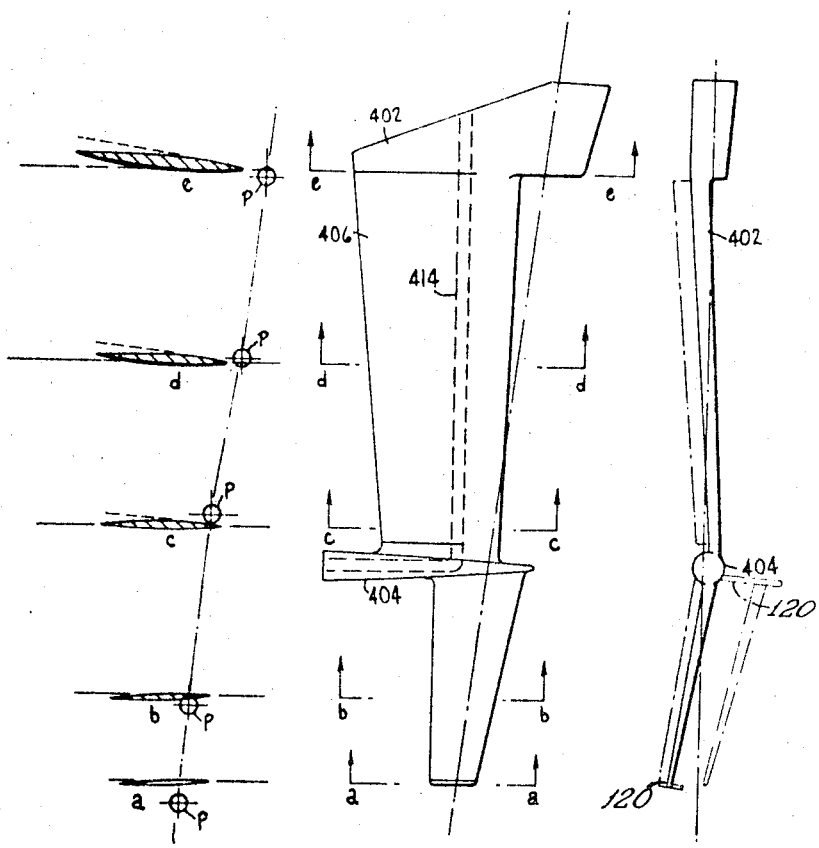

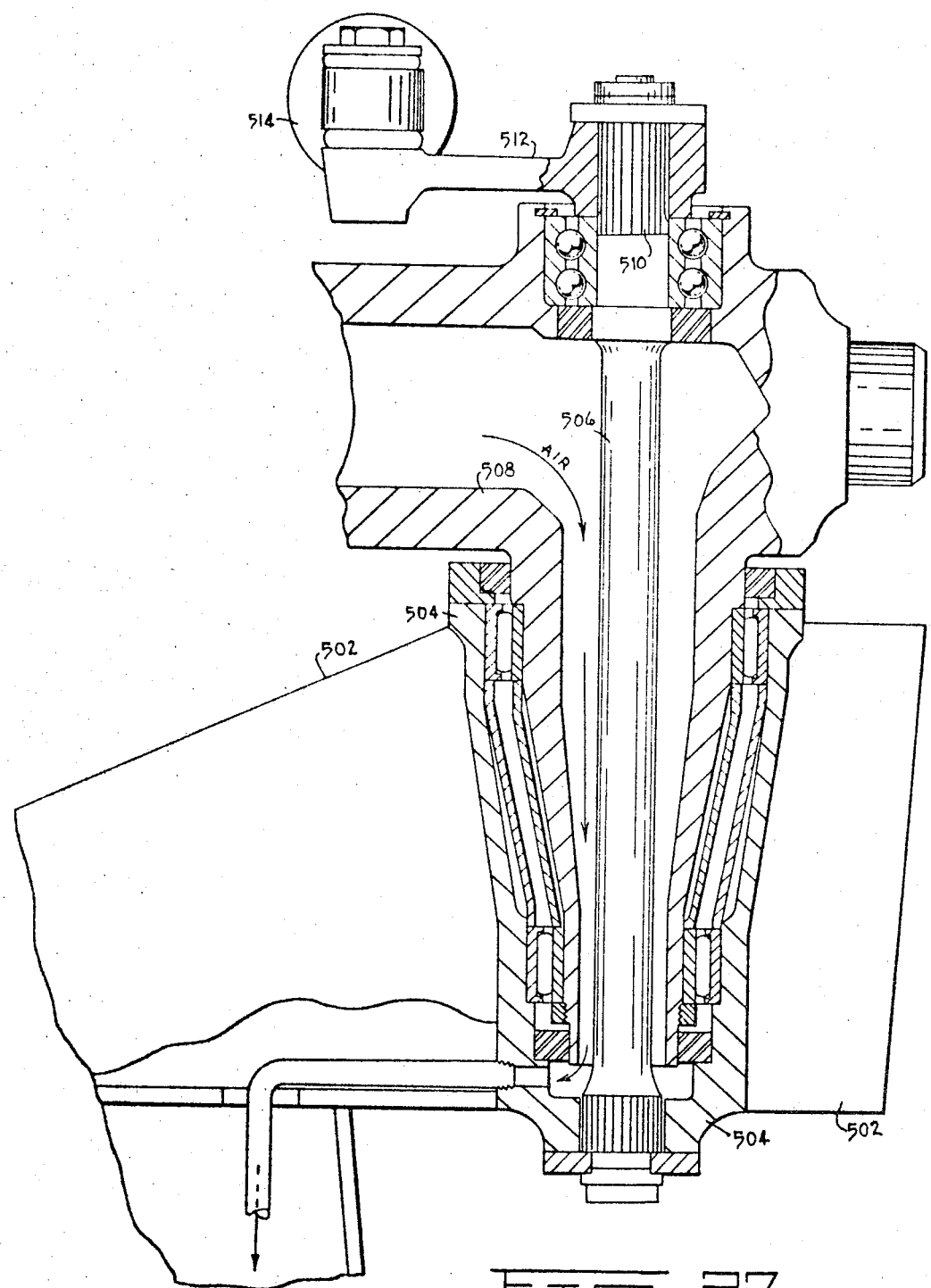

United States Patent Office

3,267,897
Patented August 23, 1966

3,267,897
HYDROFOIL CRAFT
Francois M. Picker, 1958 Des Cedres Ave.,
St. Bruno, Quebec, Canada
Filed Nov. 16, 1964, Ser. No. 411,439
8 Claims. (Cl. 114—66.5)

The present invention relates to a type of water vehicle commonly referred to as a hydrofoil craft. Such crafts are distinguished from other types of sea going crafts in that while travelling they remain at or above the surface of the water solely on account of the hydrodynamic properties of wing like members called hydrofoils; the buoyancy of the craft being of no consequence. The invention relates particularly to a new type of hydrofoil, the operation of which is highly flexible in comparison to that of the other known hydrofoils and their related systems. This application is a continuation-in-part of application Serial No. 231,150, filed October 17, 1962, and now abandoned.

The hydrofoil craft to which the present invention is applicable necessarily comprises a hull which does not essentially differ from that of any other craft and which is capable of navigating conventionally. The hydrofoil craft is, however, characterized in that it is provided with a number of wing like fins, called hydrofoils, which can be retracted or extended at will and which when extended and when sufficient speed has been acquired will sustain the hull of the craft above the surface of the water and cause it to remain in that attitude through the sole action of the lifting forces thereon. In this the craft does not differ from any other type of hydrofoil crafts.

Characteristically, the hydrofoil craft in accordance with the present invention has a number of hydrofoils which at hydrofoil cruising speed are partly submerged in water, and which are remarkably similar to aerodynamically stable wings. Each foil makes at the point of its immersion a dihedral angle with the horizontal plane of the water surface, said angle may be acute outwardly and obtuse inwardly or vice versa. In one embodiment, each foil is mounted at the end of a leg member in a manner such as to allow dampened pivotal rotation about its own axis; each leg member being pivotally connected at its other end to the hull of the craft at a point thereof which preferably lies above the water line at conventional cruising speed; the pivotal connection of the hull and leg being such as to permit general raising or lowering of the hull by means of a corresponding pivotal movement of the leg; each leg movement taking place about an axis which is parallel to the pivotal axis of the corresponding hydrofoil, or nearly so. Furthermore, each leg is capable of suspension pivotal movements about the same pivotal axis and in response to uneven water surface conditions.

In another embodiment, the leg member is dispensed with and the foils are pivotally connected directly to the hull adjacent the keel region thereof. In this embodiment, the foils can be drawn upwardly from the water to rest adjacent the sides of the hull when the craft is to be used as a common displacement boat.

The hydrofoil crafts presently known to the inventor are meeting with considerable difficulties which stem in large measure from the fact that the foils are almost invariably rigidly mounted on the supporting legs or on the hull itself. The effect of this is an overall lack of flexibility in the operation of the craft.

The system developed by Hook places before the leading edge of the foil a water skimming device which is connected by means of a suitable leverage to the pivotal axis of the foil. The skimming device senses the irregularities in the surface of the water and imposes to the foil a corrective change in angle of attack. However, such a system is possible only if the foil is completely submerged at all times.

Moreover, there is additional outlay for control devices and these must be highly reliable to withstand the beating force of a rough sea. In the case of the present invention, however, the foils are never completely submerged and no such sensing element is used. The lack of complete immersion and the self adjusting angle of attack ensure at all times an ample reserve of lifting capacity which in the prior art has been achieved by, for example, placing one above the other in step-ladder like arrangement a series of generally horizontal fixed foils at least the uppermost of which would normally be out of the water.

The use of a sensing element before the foil as a means of piloting the foil is rather ineffective. In the present invention the foil has a hydrodynamic profile combined with a special configuration and pivot like mounting hereinafter described which renders it self piloting.

In all the hydrofoil crafts presently known to the inventor and particularly in those where the foils are mounted on retractable legs; in order to make it climb, so to speak, on its hydrofoils it is necessary to first navigate the craft slowly and conventionally to sufficiently deep waters, and to then fully extend the legs at a dead stop or nearly so before starting again and acquiring sufficient speed to raise the hull of water. With the craft of the present invention, however, the switch over from conventional navigation to hydrofoil navigation is a gradual process which takes place as the craft acquires speed and which necessitates neither stopping nor deep waters. This advantage stems mainly from the relatively free pivotal securement of each foil to each leg.

Furthermore, being relatively freely pivotable the hydrofoils in accordance with the invention, have the ability to constantly be adjusted by the water so as to present to the water the optimum surface of lift and angle of incidence, the whole resulting in a well balanced self piloted and dampened ride.

According to one embodiment of the present invention, the supporting legs are pivotally secured to the hull at points symmetrically distributed with respect to the vertical axial plane of the craft, and each leg when so secured is connected to an appropriate suspension system whereby any unevenness in the surface of the water is absorbed by a corresponding temporary retraction or outstretching of the leg. Such suspension retraction and outstretching of the leg would, generally speaking, not be possible if the fin or hydrofoil itself was fixedly and non-pivotally secured to the leg, as it would be accompanied by a change in the angle of incidence of the foil which would cause a disastrous, further and cumulative retraction and out-stretching. Thus, it can be appreciated that where the foil or fin is rigidly secured to the leg, the leg has to maintain at all times an unchanging degree of extension with the result that every irregularity of the surface of the water is necessarily communicated to the hull of the craft, except perhaps for the very short period ripples of the surface of the water; their effect being to a large extent cushioned.

With the novel and additional degrees of freedom which result from the pivotal securement of each fin to its respective leg, and from the pivotal securement and suspension connection of the leg to the hull, the effect on the hull of only the longest of waves can be felt, the very short waves or ripples being absorbed mostly by the fins themselves whereas the small and medium size waves can be absorbed by the combined action of the suspension of the legs and of the fins themselves. Thus, although the choppiness may impose limits on the use of the hydrofoil of the present invention, such limit stands much higher than in the case of any of the formerly known hydrofoil systems.

Additionally to the pivotable securements of the foils to legs and of the legs to the hull, it is also within the scope of the present invention to provide means for oppositely varying the dihedral angle of the fins or foils of at least one of the transverse pairs. Such variation of the dihedral angles is found to be a very effective means for steering the craft and/or for compensating for unbalanced loading of the craft. It will be explained later how the change in the dihedral angles, being equal but in opposite directions for the two hydrofoils of a transverse pair, fore or aft pair, induces steering of the craft and appropriate banking.

Other features and advantages of the invention will become apparent as the following description proceeds, having regard to the annexed drawings wherein:

FIG. 1 illustrates in perspective view, a hydrofoil craft equipped with a hydrofoil system of the invention.

FIG. 2 is a front view of a similar craft as it cruises in straight line, showing in dotted the position of one of the foils at full retraction and at intermediate extension or when passing over a wave;

FIG. 3 is a plain view of the craft of FIG. 2;

FIG. 4 is a side elevation view of the same;

Figure 19:
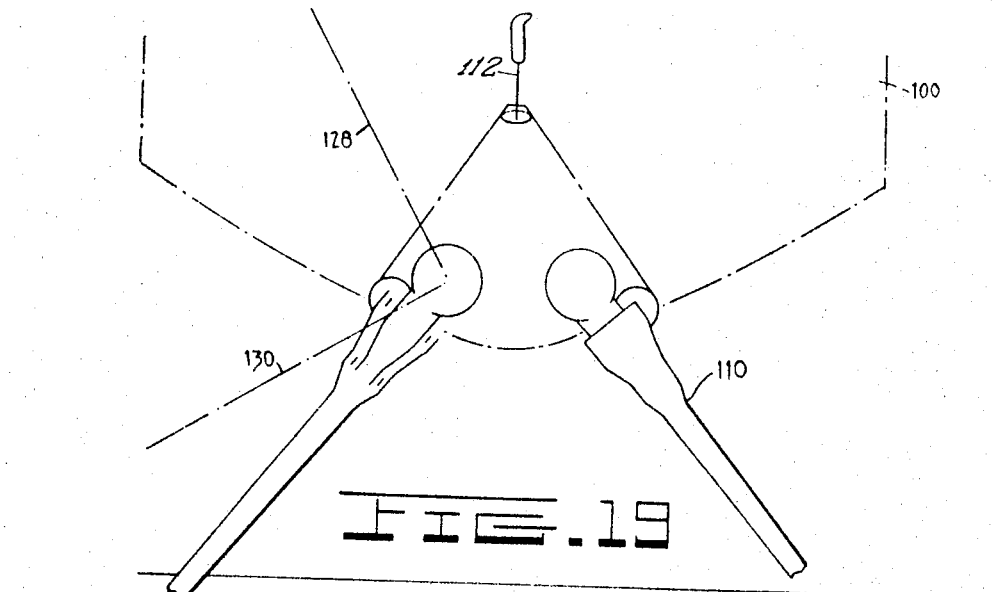
Figure 21:
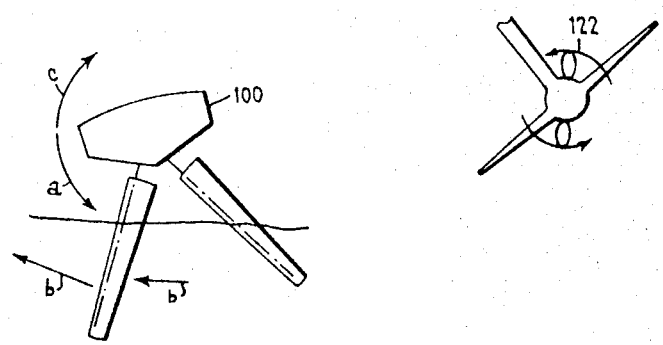
Figure 20:
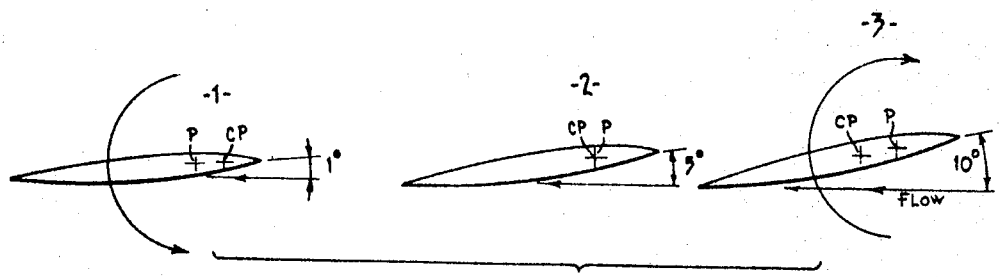

FIGS. 5, 6, and 7 are views of the craft shown in FIG. 2, showing the banking of the craft, the attitude of its supporting legs and of its foils during a turn in the direction of the arrow in FIG. 5;

FIG. 6 being a traverse sectional view on line 6—6 of FIG. 5;

FIG. 7 being a front view, in which to avoid confusion the rear legs and foils as shown in FIG. 6 were eliminated;

FIGS. 8, 9 and 10 are plan views of various hydrofoil designs which would be appropriate for use in connection with either embodiment of the present invention;

FIG. 11 is a view of a hydrofoil assembly taken in a plan normal to the axis of pivotal movement of the leg;

FIG. 12 is an end view along line 12—12 of FIG. 11;

FIG. 13 is a sectional top view of the hydrofoil assembly of FIG. 11;

FIG. 13a is an end view on line a—a of FIG. 13 showing the steering joint, the surrounding sealing bellows having been omitted for the sake of clarity;

FIG. 14a is a top plan view of an optional control mechanism for use in applying a constant torque to induce or increase the angle of attack of the foil in cases where the hydrofoil either has unmatched pivotal axis and line of centers of lift, or is not of self-sustaining hydrodynamic profile, or where it is merely designed to improve the lift characteristics of the hydrofoil generally;

FIG. 14b is a sectional view of the same taken along the line b—b of FIG. 14a;

FIG. 15 is a suggested basic hydro-pneumatic suspension diagram for the hydrofoil assemblies of the invention;

FIGS. 16–17 are plan and elevation views, respectively, of a craft in which only the frontward pair of hydrofoils is in accordance with the invention;

FIG. 18 schematically illustrates a further embodiment of the invention showing the foils being pivotally connected to the hull of a craft thereby dispensing with the legs;

FIG. 19 is an elevation view of the rear foils of the craft shown in FIG. 18 indicating the several operative positions of the foils;

FIG. 20 shows the relationship between the angle of attack and the position of the centre of pressure on a foil pivotally mounted on a shaft according to the present invention;

FIG. 21 is a schematic front view of a craft equipped with foils of the present invention showing how the craft is steered by reaction on the foils by the water;

FIGS. 22a, 22b and 22c illustrate a particular foil in elevation chord profile and plan views respectively and shows the relationship between its pivot axis and the chord of the foil;

FIGS. 23a, and 23b show another foil of the inverted gull wing type in side elevation and chord sections therealong respectively;

FIG. 24 is an end elevation of the foil in FIG. 23;

FIGS. 24a and 24b show graphically the lifting forces and momentum forces, respectively, of the foil in FIGS. 23 and 24;

FIGS. 25a, 25b and 25c show sections, plan, and elevation views respectively of a still further embodiment of the foil of the present invention;

FIG. 26 is an enlarged sectional drawing of foil section "c" in FIG. 25; and

FIG. 27 is a sectional drawing of a pivotal mount for a foil of the present invention.

FIG. 1 illustrates a hydrofoil craft comprising a hull 1 equipped with a pair of front hydrofoil assemblies 3 and rear hydrofoil assemblies 5. The craft is propelled either by air propeller 7 or water propeller 9.

Hydrofoil assemblies 3 and 5 are retractable and can be made to move toward and away from hull 1, as will hereinafter be more fully explained. Each assembly comprises a leg 11, one end of which is pivotally connected to hull 1, and a freely pivotable hydrofoil 13 mounted pivotally at the other end of leg 11. Damping means 12 are provided, as will hereinafter be more fully described, to avoid unduly sudden changes of the angle of attack or to dampen the elastic oscillations of the hydrofoils 13, while preserving the desired freedom of pivotal movement of the hydrofoil required for its self-control. As illustrated in FIG. 2, particularly on the right-hand side, when the hydrofoil assemblies 3 and 5 are retracted, the hydrofoils 13 of the respective assemblies move up or downwardly, and forwardly or rearwardly to lie against and under hull 1 at a dihedral angle of approximately 45° as will hereinafter be explained.

The situation illustrated in FIGS. 5, 6, and 7 is that which prevails when the craft is steered in one direction, in this instance down to the right as illustrated in FIG. 5.

For steering the craft, the hydrofoils 13 of the rear assemblies 5 are rotated in opposite directions about the longitudinal axes of their respective legs in such a way as to change their dihedral angle in relation with water level 15. Although the changes of dihedral angle are equal for the two hydrofoils 13, of the rear pair of assemblies, the variations are in reverse directions. That is, the right hydrofoil 13 will be made to penetrate more deeply into the water while the left hydrofoil will be made to penetrate less deeply. This will cause an unbalance in the components of force on the rear fins 13, said unbalance tending to make the rear of the craft drift toward the side of the fin which has the least dihedral angle, i.e., towards the steepest of the rear fins. At the same time, the resultant vertical unbalance in the vertical components will cause the craft to bank as in FIGS. 5 and 6, away from the side of the fin which has the flattest dihedral angle, i.e., toward the outside of the turn.

The front hydrofoil assemblies 3 on the other hand, being of fixed angular attitude with respect to the hull, will nevertheless be affected by the induced banking which, will cause an opposite change in the dihedral angles and corresponding unbalance in the horizontal components of the lifting forces acting on them thereby tending to cause the craft to drift to the right as in FIGS. 5 and 7. This front horizontal resultant drift force is therefore the reverse of that which is acting at the rear, and will further enhance steering of the craft.

FIGURES 8, 9, 10 and 22 to 26 inclusive illustrate various different hydrofoil profile and outline designs having various characteristics and which constitute the present invention.

Referring to FIG. 20, there is shown three different profiles of a hydrofoil indicating the effect thereon by the water depending on the positions of the pivotal axis P in relation to the centre of pressure CP. As shown in Example 1 of FIG. 20, the natural angle of attack is 1° and the pivot P is back on the chord of the foil from the centre of pressure CP. There is therefore a tendency for the water to increase the angle of attack by bringing the CP counter-clockwise about the pivot point.

In Example 2 P and CP are co-axial so that the angle of attack remains constant. However, in Example 3 the CP is back of the pivot point as in reverse to Example 1 so that the profile movement is clockwise so as to reduce the angle of attack.

It will be appreciated that in all the above examples the profile adjusts itself as does a weather vane, but with an angle of attack dependent of the position of the pivot P on the chord of the profile. In fact, for a free-pivoting profile of a foil of the present invention, the angle of attack and the optimum and definite flow pattern can be settled at the design stage by the positioning of the pivot on the chord of the profile.

In the hydrofoil design of FIG. 8, the line of the centers of lift 20 is parallel to the pivotal axis 21 and corresponds thereto. So the angle of attack is constant along the hydrofoils while the degree or depth of immersion is a combined function of the load and of the speed of the hydrofoil. In the design of FIG. 9, the line of the centers of lift is at an angle with and intersects the pivotal axis. Therefore, with such a design the depth of penetration of the fin in water and its angle of attack is a combined function of the load and of the speed of the hydrofoil. In the case of the hydrofoil design of FIG. 10, the two features of FIGS. 8 and 9 are combined.

Such foil section profiles are similar to wing section profiles of stabiliserless aircrafts, known as stable wing section profiles in which the center of lift pressure is displaced in a forward direction as the angle of attack decreases and backwardly as the angle of attack increases.

Therefore, in case of the hydrofoil of FIG. 8, there can be only one angle of attack, namely the one wherein the center of lift pressure corresponds to the pivotal axis, e.g., Example 2 of FIG. 20.

This means that an ideal angle of attack can be selected by the craft designer and that there can be no permanent departure therefrom; in other words, should the load on the craft or the speed thereof change, the hydrofoil will change its degree of submersion until enough is submerged to produce the lifting force necessary to sustain the craft out of water. Should the level rise such as when encountering a wave, the hydrofoil pivotally reacts immediately to keep this level and the angle of attack constant thereby to follow a path parallel the wave profile.

In the case of FIG. 9, the angle of attack as well as the depth of immersion vary to adjust the hydrofoil to new conditions of weight or speed as follows: at low speed, water level will be at B and the center of lift at $b$, i.e., at the intersection between the pivotal axis and the center of pressure. This position $b$ can be chosen at design stage to obtain maximum angle of attack combined with the maximum surface immersion, thereby providing optimum lift for the take off speed. At high speed the water level might be at C and the center of lift at $c$, the intersection between the pivotal axis and the center of lift pressure; this new position of the center of lift corresponding to an optimum angle of attack for high speed is also selected at the design stage.

Now, if speed increases again and cavitating flow appears accidentally, the center of pressure will move backward, thereby introducing a moment around the pivotal axis and inducing a new level of immersion and smaller angle of attack; this will prevent disastrous stalling and by use of a torque booster 33 (FIG. 14) bring the possibility of passing evenly at desired time or speed, from streamline flow to cavitating flow. The profiles shown in FIGS. 8, 9 and 10 may be appropriately twisted or have different design profiles along span, such as those shown in FIGS. 22 to 25, from stable to full camber to give them even more desirable hydrodynamic reaction characteristics. In short, the hydrofoil of the invention gives fully automatic piloted ride on waves, self control of optimum hydrodynamic flow around the hydrofoil at any speed and a constant control over stalling and uneven cavitation flow.

The various mechanisms necessary for the functioning of the hydrofoil craft according to the invention will now be explained. In this regard, reference is particularly made to FIGS. 11, 2, 13, and 14.

It was mentioned previously that a damping device is preferably used to prevent undue vibrations due to periodic oscillations or sudden changes in the angle of attack of the hydrofoils 13 due to sudden changes in water level, or unstable cavitating flow patterns. An example of a suitable damping device is more particularly illustrated at 25 in FIG. 11. It is mounted in an enclosure 23, preferably located on the side of the leg 11 opposite that of hydrofoil 13.

In this frictionless and leakproof damper, longitudinal slots in rod 26 make modulation possible, by imposing variable restriction to the passage of fluid from the chambers 27 to the outer chambers 28 defined by the piston and housing assembly and by the resilient bellows envelope. Each of chambers 27 communicates with the adjacent chamber 28 by means of a check valve 29 shown diagrammatically, which prevent free flow from chambers 27 to 28 and give free passage of fluid in the opposite direction. The two chambers 28 communicate freely through passage 30.

In FIG. 14 is illustrated an optional positive control 33 for the hydrofoil. This control is formed of two semi-cylindrical enclosures 35 between which is pivotally mounted the hydrofoil shaft 31. To this shaft 31 is connected dividing plates 37 extending radially across the semi-cylindrical enclosures 35. Compressible fluid pressure may be admitted in the chambers thus formed by any suitable means, such as pipes 39 and 31, which can alternatively be used as inlets or outlets.

The application of a constant torque on the hydrofoil pivot by means of, for instance, air pressure, permits a hydrofoil configuration of the type shown in FIG. 9 wherein the pivotal axis 21 may be ahead of the line of centers of lift 20. This permits influence of the free reaction of the foil so as to change its natural angle of attack and/or depth of penetration. This device can be used also as a booster to voluntarily change the flow characteristics of the foil from streamline to cavitating.

The suspension mechanism which also serves for the retraction and extension of the hydrofoils is best illustrated in FIG. 13. It is seen that to a hollow shaft 43, mounted on the hull 1 for oscillation about an axis transverse to the hull and preferably making an angle of 45° or thereabout with the horizontal, has one end thereof flaring outwardly as at 45. The leg 11 bends at the upper end thereof to form a head 49 receivable in the hollow shaft 43 and provided with oppositely mounted pins 51 adapted to register into the bearings 47. An expandable sealing bellow 53 is mounted over and around the upper end of the leg 11 and outer end 45 of shaft 43.

By the afore-described arrangement, it will be understood that the hydrofoil assembly is articulated about the axis of the hollow shaft 43 and that it is also articulated for steering purposes about the axis of pins 51. It should be noted that pins 51 follow the pivotal movements of leg 11 about the axis of shaft 43.

The axis of pins 51 is transverse to that of the hollow shaft 43. To render steering as effortless an operation as possible, such pin 51 should be given an orientation whereby its projected axis would be in the closest possible alignment with the average position of the center lift 55 of hydrofoil 13.

The other end of hollow shaft 43 is connected to a hydraulic piston assembly 57 having a connecting rod 59 eccentrically connected to hollow shaft 43. Fluid pressure is applied on one side of piston 61 while spring pressure such as by spring 63 and/or air pressure is applied on the other side thereof. A fluid connection 65 will connect piston assembly 57 with the other piston assemblies of the other hydrofoil assemblies of the craft, as will be shown later.

It will thus be understood that a variation of the pressure in the piston assembly 57 will cause pivotal movement of hollow shaft 43 and consequently of the hydrofoil assembly about the axis of the hollow shaft 43.

Steering of the hydro craft is obtained by rotating the hydrofoil assembly about the axis of pins 51, as aforesaid. For this purpose, head 49 is provided with an actuating arm 67 extending within the hollow shaft 43 and generally along the pivotal axis thereof. The outer free end of actuating arm 67 is freely attached to one end of upstanding lever 69, the free end of which is pivotally fixed to one branch of a triangular plate 71. Plate 71 is made to rotate about a pin 73 while being pivotally connected at the third branch to a reciprocating member 75. Reciprocation of this member 75 is obtained through a steering mechanism 77. Thus, operation of the steering mechanism such as steering box 77 will cause reciprocation of member 75 which will pivot the triangular plate 71 to cause reciprocation of upstanding lever 69 and consequent up and down motion of actuating arm 67 which in turn occasions a change in the dihedral angle of the foil by pivotal movement of the foil and leg assembly about pin 51. Member 75 extends fully to the other side of the hull where it is similarly connected to the opposite hydrofoil assembly. Such a system at the rear is effective for steering but a similar one can be used on the front assemblies to compensate uneven load distributions.

FIG. 15 illustrates a typical hydraulic suspension mechanism. In this diagram, the four hydraulic pistons 57 for a hydrofoil craft as illustrated in FIG. 1, are shown as all interconnected through damping devices 79 and to a common reservoir 81 under pressure. The damping mechanism 79 themselves are of well known design and are intended to avoid any undue reaction from any sudden surge of pressure in one of the piston assemblies 57 resulting from, for example, waves. Common reservoir 81 is under controllable pressure, so that whenever it is necessary to retract or extract the hydrofoil assemblies, the pressure in the reservoir is changed accordingly.

The air pressure in reservoir 90 can be adjusted independently on each hydrofoil assembly in such a way as to create more or less back pressure on piston 61. This is to balance hydrofoil vectors of corrected dihedral angle used to adjust uneven loading of the craft and may also assist steering and stabilisation of the craft.

FIGS. 16 and 17 are illustrative of an embodiment wherein only the front portion of a craft is supported by a single pair of hydrofoil assemblies in accordance with the invention, the rear portion being supported and propelled by an outboard motor 87 equipped with a number of laterally extending fixed and fully submerged foils.

It has also been suggested that the bulk of the weight of a craft could be supported from a point in the vicinity of its center of gravity by means of conventional hydrofoils and that in such an instance the hydrofoils of the invention would be used to support the balance of the weight of the craft and to act as stabilisers.

Although in the various embodiments illustrated in FIGS. 1 to 17 the rear pair of legs is shown directed rearwardly whereas the front pair is shown as being forwardly directed, it should be understood that the direction of the leg is purely a matter of choice.

FIG. 18 schematically illustrates a further embodiment of the invention. It will be seen that a craft 100 is provided with a pair of forward hydrofoils 102 pivotally mounted by bearings 104 to a connecting shaft 106, the latter being pivoted in turn to the hull of the craft 100 by means of a shaft 108. There is also provided rear foils 110 which are pivotally, but not freely, mounted to the hull. Rear foils 110 are oriented by suitable steering means such as a stick 112 and they serve to enclose drive shafts 116 and screws 118. Moreover, it will be seen from FIG. 19 that the foils are provided adjacent their outer tips with damping planar fins 120 which serve to cushion the immersion of the foils 110 and 102 and contribute to support a substantial part of the water craft. Screws 118 on the rear foils contrarotate in the direction of the arrows 122. (FIG. 19.)

The drive shafts may be connected suitably to an engine 124 and gear box 126.

It is to be particularly noted from FIG. 19 that the foils 110, together with front foils 102, are pivotally mounted to the hull of the craft 100 as close as possible to its keel region or central longitudinal axis as possible so that the foils 102 and 110 diverge away from the centre line of the craft into the water as shown. Such an arrangement is desirable when the craft is designed for running in high seas or rough open water in that the keel section of the hull is raised substantially higher from the water than is possible with known hydrofoil craft. Furthermore, the foils 102 and 110 may be retracted to the position indicated at 128 in FIG. 19 when the craft 110 is to displace in normal running. A take-off position is shown at 130. The foils 102 and 110 may be retracted by suitable gear boxes 132 and shafts 134. These, however, are a matter of design and choice.

For running of the craft 100 in calm water such as lakes or rivers, the foils 102 and 110 may be pivotally mounted to the hull at the sides thereof.

FIGURE 21 illustrates the steering and restoring action of a craft 100 equipped with self-piloting hydrofoils 102 of the present invention. It will be understood that if a roll momentum (arrow $a$) is induced to the craft by a differential twisting of any kind by the rear hydrofoils 110 (not shown) there is a resultant steering action $b$ by the action imposed by the water on the foils 102 with a corresponding restoring momentum $c$. Furthermore, with the foils 102 so arranged there is substantially less influence on the craft 100 by waves when the latter are being cut by the craft diagonally. Therefore, the automatically reacting hydrofoils retain their angle of attack independent of any possible yaw or pitch of the craft.

FIGURES 22a, 22b and 22c show a hydrofoil 202 pivotally mounted by means of pillow blocks 204 to a craft 200. The upper marginal end edge of the foil 202 is secured to a shaft 206 pivotally positioned in the blocks, the upper end of the shaft being provided with a crank 208 one end of which is operatively connected to a damper 210. The latter may be provided with adjusting valve and a reservoir (not shown) to compensate for leak. It will be noted from profile sections $a$, $b$ and $c$ of FIGURE 22b that the pivotal axis P of the foil changes with respect to the chord thereof throughout its length or immersion depth in the water $w$. Moreover, the foil 202 is twisted somewhat as indicated by the disposition of the leading edge of the foil in the end elevation view. Therefore, as the speed of the craft 200 increases or decreases or if the sea height varies the immersion depth of the foil 202 its changing configuration provides the most suitable angle of attack, the tracking of the foil acting automatically.

It will be appreciated that the surfaces of the foil 202 in FIGURES 22a, 22b and 22c extending from the craft downwardly to the thin fin, provide dynamic surfaces or areas to effect both the lift of the craft and the piloting thereof. In addition, the planar fin 120 provides a passive portion for damping of vertical oscillations of the watercraft that are induced thereto by the dynamic portions of the foils. By referring to FIGURES 22a through 25c inclusive, it will be noted that the passive portion, or planar fin 120, is fixed on the outer terminal end of the foil and is therefore at right angles or normal to the pivotal axis P of the foil so that the surfaces of the fin 120 are fixed in angles about the hull or longitudinal axis of the watercraft. The fin 120 therefore performs as a fixed secondary hydrofoil of relatively small area. It dissipates into the water the work developed by the dynamic areas of the foil 202. This damping action is not unlike that of a shock absorber in an automobile which dampens out vertical oscillations effected by the springing mechanisms.

In FIGS. 23 and 24 the foil 302 is of double dihedral or inverted gull-wing configuration providing a piloting portion 304 and a lifting portion 306. It will be appreciated from reference to the profile sections in FIG. 23 that the pivot axis P is chosen to provide optimum tracking characteristics in the pilot portion 304 whilst in the lifting portion the pivot P is placed well below the profile to obtain maximum lift.

FIG. 24a illustrates graphically how the combination of pivot axis and chord provide the desired lift force areas 308 with the foil immersed at an average water line. When encountering high seas (water line 2) both lift forces and pilot areas are increased as shown by the expanded graph lne 310.

FIGURE 24b indicates the forces of momentum around the pivot axis P with regard to the foil in FIGURES 23a and 24 where the negative momentum B is equalled by the positive momentum A and C. Momentum in high seas is indicated in the expanded graph at 312.

Like an aerofoil, a hydrofoil utilizes negative pressure on its upper surface to obtain lift and in water the pressure is well below atmospheric. If this pressure extends upwardly along the foil to the water surface (which happens in foils of the partially submerged type at high speed), atmospheric pressure is drawn down onto the foil thereby causing a substantial reduction in lift.

FIGURES 25a, 25b and 25c illustrate a foil 402 having substantially the basic lift characteristics of the foil 302 of FIG. 23a as shown by the profiles a to c, 23b. However, at the junction of the pilot and lift sections there is provided a separator in the form of a bulb 404 which serves to prevent negative pressure from travelling up the foil from the lower or lift portion to the surface of the water in which the foil is operating.

FIG. 26 is a cross section of the pilot portion from profile c—c to e—e of FIG. 25 and as shown, the upper skin 406 of the foil may be opened out by air pressure along a substantial distance of the pilot portion of the profile thereby to increase the angle of attack of the lifting portion and to force stable cavitation at high speed and provide better action of the pilot portion. The skin 406 is connected to the rigid structure by perforated diaphragms 408 so as to retain the skin in shape under air pressure. Adjacent the trailing edge there is provided a sealing diaphragm 410 to retain the pressure. Air may be delivered or removed from the foil by a suitable conduit or tube 412 which can be connected to pump means (not shown) via the foil mounting as shown in FIG. 27.

There is also provided an air line 414 running through the profile of the foil 402 and extending from the upper end thereof to the blunt end of the bulb 404. This allows atmospheric pressure to be drawn down through the line and outwardly through the rear of the bulb to aereate the blunt and trailing edge of the bulb during high speed running. It will be noted from FIGURE 25c that the planar fin 120 may be positioned, not only at the tip of the foil, but anywhere along the immersed portion such as in combination with the separator 404 shown in phantom line.

FIGURE 27 shows a typical pivot mounting for a foil of the present invention. The foil 502 is fixed to a sleeve 504 connected at one end to a splined shaft 506, the other end being sealingly mounted to an arm 508. Shaft 506 passes through the shoulder portion of the arm and is provided with splines 510 to engage a lever 512 connecting the foil unit to a damper 514.

When utilizing such a mounting for a foil such as that in FIG. 26, the arm is chambered to provide passage for air to the foil profile.

It will be appreciated that the foil of the present invention may be adapted to hydrocrafts of various sizes and displacement to provide a self-control of the hydrofoil by utilizing the fluid flow therearound so that there is no need of mechanical or electronic stabilization controls; no stalling is possible due to an excessive angle of attack; and the inherent stability of such a foil is extremely high.

It will be noted from the schematic illustration of FIGURE 20 and from FIGURES 22 through 25 inclusive that the pivot axis varies in its position with respect to the center of pressure throughout the length of the foil as is shown for example in profiles a, b and c of FIGURE 22b. However, it may be said that the pivot axis P is dominantly in position either coaxial with or forwardly of the associated center of pressure of the hydrofoil whereby the desired angle of attack on the foil is commanded by the water pressure acting on the surface of the foil.

I claim:
1. A hydrofoil craft comprising: a hull, a pair of fore hydrofoil assemblies, one on each side, and a pair of aft hydrofoil assemblies, one on each side, for supporting the hull while in motion, means rotatably mounting each hydrofoil assembly of the fore and the aft hydrofoil assemblies on its respective side of the hull for movement about an outwardly and upwardly directed axis transverse to said hull, the outwardly and upwardly directed axis transverse to said hull of each hydrofoil assembly of any of said pairs of hydrofoil assemblies being normal to the outwardly and upwardly directed axis transverse to said hull of the other hydrofoil assembly of the same of said any of any pairs of hydrofoil assemblies and being symmetrical thereto with respect to said hull, each hydrofoil assembly comprising a leg member at one end of which are the said means rotatably mounting the assembly to the hull and at the other end of which is rotatably mounted a wing shaped hydrofoil fin, said wing shaped hydrofoil fin being mounted for dampened rotary movement about its own axis, said axis of said wing shaped hydrofoil fin being parallel to the respective said outwardly and upwardly directed axis transverse to said hull of the same assembly, each of said wing shaped hydrofoil fins having a hydrodynamic profile whereby it naturally adjusts its angle of attack and depth of immersion so as to sustain the craft out of water, while in motion.

2. A hydrofoil craft as claimed in claim 1 wherein means are provided whereby, for steering said craft, each leg of the said aft pair of hydrofoil assemblies is rotatable about substantially its own axis, additional means being provided to assure equal and simultaneous rotation about its own axis of the leg of each assembly of the aft pair of assemblies.

3. A watercraft hydrofoil assembly including a pair of hydrofoils adapted to be mounted forwardly of the centre of gravity on said craft adjacent the keel section thereof; said foils being of wing-like configuration and profile, each having a longitudinal pivot axis and an associated centre of pressure; said foils being adapted to extend from said keel section divergently downwardly and angularly outwardly, with respect to one another, from said keel section to provide substantial planing surfaces for said craft in movement out of water; each hydrofoil of said pair being freely rotatable about its pivotal axis for automatic orientation there around in response to ambient pressure of said water; said pivotal axis being dominantly positioned coaxial with or forwardly of their associated centres of pressure whereby the hydrofoils retain a predetermined angle of attack commanded by said water acting on the hydrofoils; each said foil including, in combination, an active dynamic portion for supporting and controlling the height of said craft over the water and a passive portion secured to, and disposed angularly with respect to, the dynamic portion for damping vertical oscillatory movement of said craft induced by said dynamic portion.

4. A hydrofoil assembly according to claim 3 wherein each foil is twisted in chord throughout its length so that its pivotal axis is situated ahead, above and below the centre of pressure at selected profiles thereof to provide various water controlled angles of attack in relation to various immersion depths in said water.

5. A hydrofoil assembly according to claim 3 wherein said dynamic potion of each foil comprises a piloting area constituted by the upper section of said foil adjacent the keel of said craft and a supporting area constituted by the lower section of the foil remote from said keel; said passive portion comprising a planar fin fixed to said lower section of said foil and with the surface of the fin being disposed normal to the longitudinal pivotal axis of the foil.

6. A hydrofoil for watercraft comprising a structure of winglike configuration having leading and trailing edges and being adapted to be mounted on said craft forwardly of its centre of gravity and adjacent the keel section thereof and to extend downwardly and angularly outwardly from said keel to provide a substantial planing area for said craft; said hydrofoil being freely rotatable in its mounting about a longitudinal pivot axis thereby beng automatically responsive to orientation around the pivot axis by water in which said foil operates; said hydrofoil including
   (a) a lifting portion adjacent its lower end;
   (b) a piloting portion adjacent its upper end;
   (c) a passive damping portion comprising a planar fin fixed on and normal to the lower end of said foil; and
   (d) a separator intermediate said piloting and lifting portions adapted to prevent negative pressure from travelling upwards from said lift portion to the surface of said water during high speed running of the foil; and
   (e) a passageway extending through said foil from its upper end to the end of said separator adjacent the trailing edge of said foil whereby atmospheric pressure may be drawn through said foil and outwardly through said separator for aereating the latter.

7. A hydrofoil according to claim 6 wherein the piloting portion thereof includes an air chamber defined by its upper and lower surfaces, the upper surface being hingedly connected to the foil adjacent the leading edge thereof and flexibly connected adjacent the trailing edge whereby the upper surface may be opened adjacent the trailing edge to alter the profile of said piloting portion of the foil thereby to increase the angle of attack of the lifting portion and provide stable cavitation thereof at high running speed; and a conduit in said foil for delivering to or removing air from said chamber to effect opening or closing of said upper surface.

8. A hydrofoil watercraft comprising a hull having a keel section, a pair of forward hydrofoils and a pair of aft hydrofoils mounted ahead of and behind, respectively, the centre of gravity of said craft and being mounted adjacent the keel section of said craft;
   (a) each said pair of foils extending from said keel section divergently downwardly and angularly outwardly from the longitudinal axis of said keel section to provide projecting planing surfaces for supporting said craft in movement out of water;
   (b) said hydrofoil being of wing-like configuration and profile to include a hydrodynamic centre of pressure with the surfaces of the foils providing active dynamic areas for supporting and controlling the height of said craft over the water;
   (c) means for manually actuating said aft foils to induce a momentum about the longitudinal axis of said craft to incline the latter;
   (d) each foil of the forward pair thereof being freely rotatable in its mounting on said craft about a pivotal axis that is dominantly positioned, along said foil, coaxial with or ahead of the centre of pressure of said foil to (i) be automatically orientable about said pivot axis in response to changes of fluid pressure on said forward foil induced by actuation of the aft foils; (ii) to steer sad craft in the inclination direction and create a restoring momentum to stabilize said craft in proportion to the action of said aft foil assembly; and (iii) to retain a constant angle of attack on said foils independent of yaw of the craft;
   (e) and a passive damping member fixed to the outer end of each hydrofoil and disposed normal to the pivotal axis thereof whereby the passive member has its surface in an angle that is fixed about the longitudinal axis of the keel section of said craft to provide a fixed secondary foil of relatively small area for damping out vertical oscillation induced to said craft by dynamic areas of said hydrofoils.

References Cited by the Examiner

UNITED STATES PATENTS

| | | | |
|---|---|---|---|
| 2,771,051 | 11/1956 | Von Schertel | 114—66.5 |
| 3,081,728 | 3/1963 | Wilterdink et al. | 114—66.5 |
| 3,085,537 | 4/1963 | Headrick et al. | 144—66.5 |
| 3,124,096 | 3/1964 | Craig | 114—66.5 |
| 3,168,067 | 2/1965 | Craig | 114—66.5 |

MILTON BUCHLER, *Primary Examiner.*

D. P. NOON, A. H. FARRELL, *Assistant Examiners.*